United States Patent [19]
Church

[11] 3,835,451
[45] Sept. 10, 1974

[54] PULSE STRETCHER FOR A RECEIVER OF A PNEUMATIC TIRE LOW PRESSURE MONITORING AND WARNING SYSTEM

[75] Inventor: Donald E. Church, Richmond, Ind.

[73] Assignee: Tyrechek, Inc., Houston, Tex.

[22] Filed: Sept. 15, 1972

[21] Appl. No.: 289,540

[52] U.S. Cl. .................................. 340/58, 325/117
[51] Int. Cl. ........................................... B60c 23/04
[58] Field of Search ........ 340/58; 325/15, 111, 117; 200/61.22, 61.25

[56] References Cited
UNITED STATES PATENTS
| | | | |
|---|---|---|---|
| 2,860,321 | 11/1958 | Strickland et al. | 340/58 |
| 3,588,815 | 6/1971 | Koonce | 340/58 |
| 3,662,335 | 5/1972 | Fritze | 340/58 |
| 3,694,803 | 9/1972 | Strenglein | 340/58 |

Primary Examiner—Alvin H. Waring
Attorney, Agent, or Firm—Bertram H. Mann

[57] ABSTRACT

An electrical apparatus provides a reliable indication which is readily identifiable once a plurality of useable electrical signals are supplied thereto as a result of a low pressure condition in a pneumatic tire of an associated vehicle. The apparatus employs an electrical device which increases the effective time duration of a useable signal and an indicator which provides the indication during the increased time duration of the useable signal and such indicator operates to automatically cease to provide an indication after a time period to thereby define the identifiable indication by a repeated activation of the indicator.

10 Claims, 6 Drawing Figures

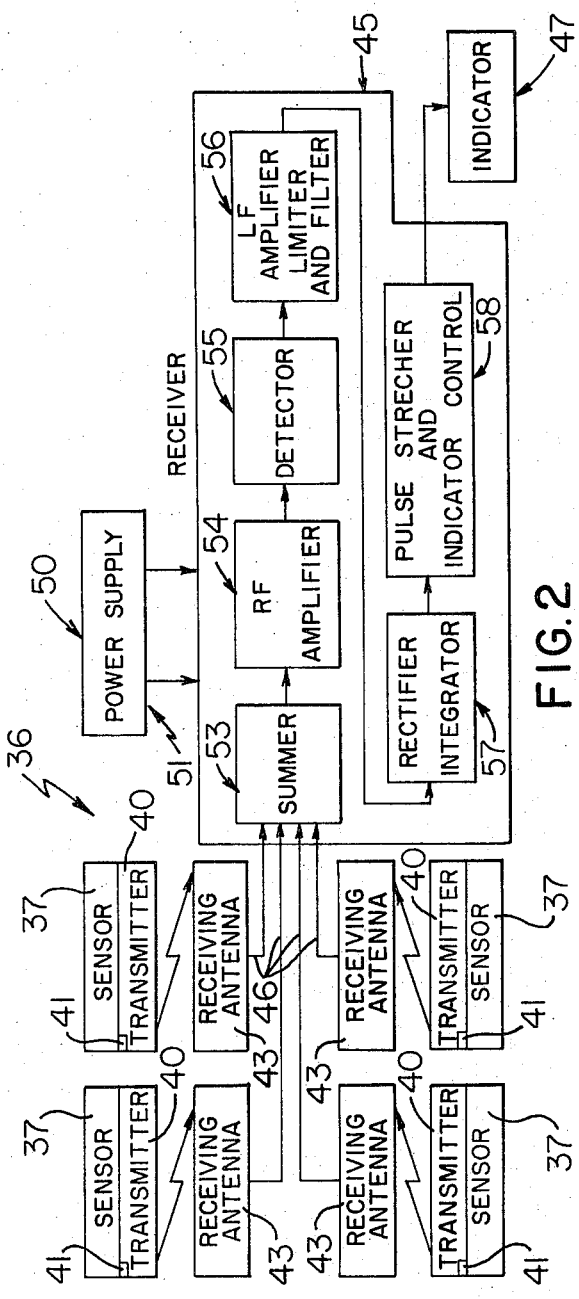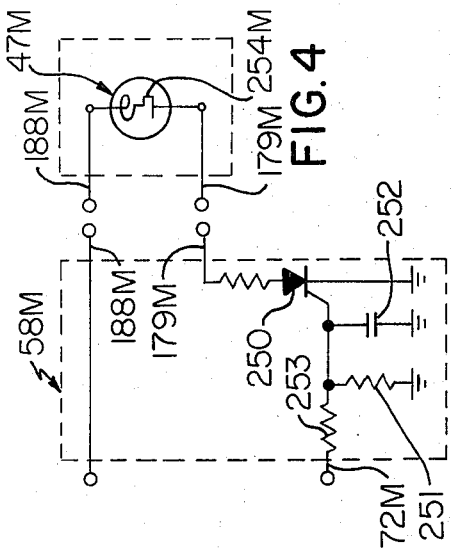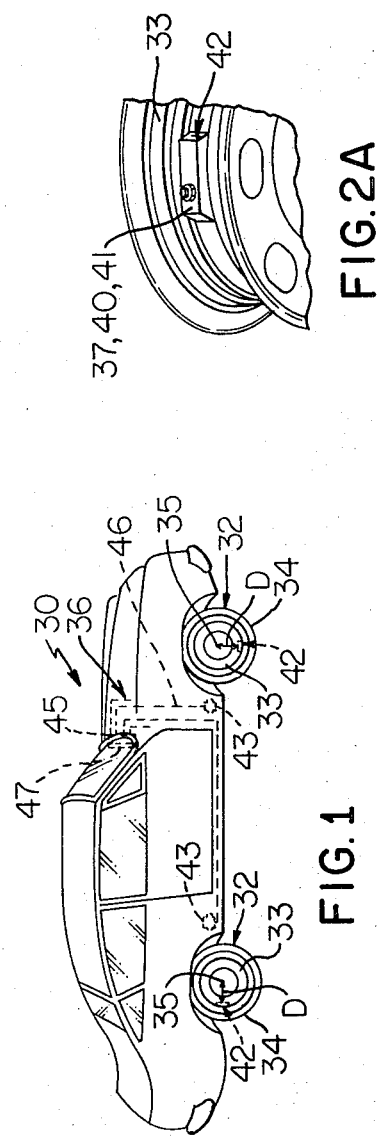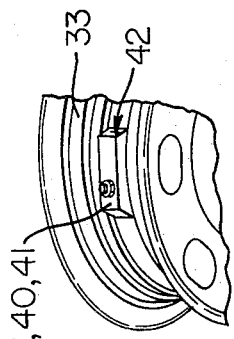

PULSE STRETCHER FOR A RECEIVER OF A PNEUMATIC TIRE LOW PRESSURE MONITORING AND WARNING SYSTEM

BACKGROUND OF THE INVENTION

In a pneumatic tire low pressure monitoring and warning system which utilizes a sensor which senses a low pressure condition in an associated pneumatic tire of a vehicle, a transmitter which is actuated by the sensor and provides output signals at a radio frequency in response to the low pressure condition, and a receiver which detects the output signals and activates an associated indicating means to indicate the low pressure condition, it is important that the indicating means be activated only by output signals provided in response to the low pressure condition and not by potentially false alarm inputs.

SUMMARY

This invention provides an electrical apparatus for providing an indication which is readily identifiable once a plurality of useable signals are supplied thereto as the result of a low pressure condition in a pneumatic tire of an associated vehicle, yet such apparatus will not provide the identifiable indication in the event a potentially false alarm input is supplied thereto. The apparatus comprises an electrical device or means for increasing the effective time duration of a useable signal supplied thereto, and indicating means providing an indication during the increased time duration of each useable signal and having integral means which operates to automatically cease to provide an indication after a time period to thereby define the identifiable indication by a repeated activation of the indicating means a plurality of times.

Other details, uses, and advantages of this invention will be readily apparent from the embodiments thereof presented in the following specification, claims, and drawing.

BRIEF DESCRIPTION OF THE DRAWING

The accompanying drawing shows a present preferred embodiment of this invention, in which FIG. 1 is a perspective view illustrating an exemplary motor vehicle utilizing one embodiment of a pneumatic tire low pressure monitoring and warning system which employs the improved electrical apparatus of this invention;

FIG. 2 is a schematic presentation of the exemplary system utilized in the vehicle of FIG. 1;

FIG. 2A is a fragmentary view of a typical assembly comprised of a sensor, transmitter, and battery comprising the system of FIG. 2 with such assembly being mounted on a hub of one of the tires of the vehicle of FIG. 1;

FIG. 2B is a schematic diagram highlighting that each receiving antenna receives a useable signal only during an angular portion of each rotation of its associated transmitter; and FIGS. 3 and 4 respectively present schematic electrical diagrams of an electrical device and indicating means which cooperate to define an exemplary apparatus of this invention.

DESCRIPTION OF THE OVERALL SYSTEM

Reference is now made to FIG. 1 of the drawing which illustrates a motor vehicle shown in this example of the invention as a four-wheeled passenger automobile 30 of well known construction which has a plurality of four wheel assemblies 32 and each wheel assembly 32 is comprised of a rotatable support in the form of a hub or rim 33 with each hub 33 carrying an associated tubeless tire 34, in a well known manner, which is inflated to a predetermined pressure with a suitable fluid such as ambient air. Each wheel assembly 32 is rotatable about an associated central axis of rotation 35 whereby the associated hub 33 and tire 34 are similarly rotatable about such central axis and in a well known manner. The vehicle 30 is powered by a suitable engine which usually drives two of the wheel assemblies 32, either the front or rear two, and the vehicle 30 utilizes one exemplary embodiment of the pneumatic tire low pressure monitoring and warning system of this invention which is designated generally by the reference numeral 36 and such system serves to warn the operator of the vehicle 30 in the event of an abnormally low fluid pressure, pneumatic pressure in this example, in any one of the four tires 34 and in a manner which will be presented in detail hereinafter.

For convenience and ease of presentation the exemplary system 36 has been illustrated as being used on a vehicle in the form of a passenger-type automobile having a plurality of four tubeless tires each of which is inflated to a predetermined pressure. However, it will be appreciated that the system is fully applicable to all types of vehicles employing either tubeless or tube-type pneumatic tires, or the like, including buses, trucks, trailers, and similar vehicles.

The system 36 comprises a plurality of four sensing means or sensors 37, see FIG. 2, and each sensor 37 is carried by an associated wheel assembly 32 and is preferably suitably installed on the hub 33 of its associated wheel assembly in a fixed manner. The detailed construction and operation of a typical sensor 37 will be presented subsequently.

The system 36 comprises a plurality of transmitters 40, each operatively connected to and being activated or actuated by an associated sensor 37 and in this example the sensor 37 and transmitter 40 associating with a particular wheel assembly 32 is provided with a self-contained power source in the form of a battery 41 and the sensor 37, transmitter 40, and battery 41 of each particular wheel assembly is provided as a single unit or assembly which is designated generally by the reference numeral 42, see FIG. 2A. The assembly 42 may be suitably installed within its associated hub 33 by threaded bolt, welding, or the like, and as a practical matter the assembly 42 and hence its transmitter 40 is located at a position which is radially displaced by a distance D from the central axis of rotation 35 of its wheel assembly 32, see FIGS. 1 and 2A.

The sensor 37 is comprised of a sealed pressurized hemispherical dome which dimples in a substantial predetermined manner when it is exposed to an external pressure greater than a predetermined minimum. The dimple action serves as a normally open electrical snap switch which closes by "oil can" action whenever the external pneumatic pressure falls below the predetermined minimum pressure which in reality is the minimum air pressure required to assure satisfactory operation of the associated tire 34.

The transmitter 40, which will also be referred to as oscillator 40, is actuated by the snap action of its sensor 37 whereby the associated battery 41 provides electrical power for the oscillator 40. The oscillator 40 is a self-pulsed oscillator which generates a radio frequency (RF) signal with distinct, readily identifiable characteristics to eliminate false alarms. The oscillator utilizes a tank circuit having a coil which is unshielded and unobstructed to the greatest extent possible to establish an external magnetic alternating near field and thereby use such coil as the transmitting antenna. Each transmitter 40 operatively associates with an associated one of four fixed receiving antennas 43 comprising the system 36 and the antennas 43 will be described in detail subsequently.

For certain applications where it may be desired to take advantage of the minimal licensing requirements in the so-called citizen's band of radio frequencies ranging between 26.97 – 27.27 megahertz (Mhz), the oscillator frequency may be located within this band and the transmitter 40 then utilizes near field transmission. The median frequency in this band is 27.12 Mhz which corresponds to a wave length of 36.26 feet and such distance is considerably greater than the distance required for the system 36 of this invention to span from a hub 33 of any particular wheel assembly 32 of a vehicle using system 36 to a location on such vehicle where an antenna for the system is likely to be located.

The use of near field transmission has the distinct advantages that in the near field zone the stationary field is of greater magnitude than the traveling field, and attenuation of the stationary field per unit of distance is greater than that for the traveling field whereby interference with adjacent electrical apparatus as well as the electrical apparatus of the vehicle 30 is minimized. Further, because transmission basically may be considered as the coupling between a stationary coil on a receiving antenna 43 and a rotating oil of an associated transmitter 40, such transmission will be controlled by the coupling factor whereby maximum magnetic coupling will provide maximum transmission.

Because of practical considerations of economy and simplicity in detecting a low pressure condition in a rotating pressurized tire, each transmitter assembly 42 and its transmitter 40 is preferably located off center, as indicated earlier, by the distance D from the central axis of rotation 35 of its associated wheel assembly 32 and hub 33. However, the assembly 42 is of small weight (roughly an ounce) and the weight thereof may be easily balanced by a regular small size automobile tire balancing weight, if desired.

With off center mounting, the previously mentioned coupling factor between a rotating transmitter 40 and the fixed coil of its receiving antenna 43 varies considerably as each wheel assembly rotates because of the variation in distance between such coils, changes in relative orientation between the coils, and the differences in shielding interposed between the coils at different relative positions thereof. As a result of these factors the transmitted output signal from the transmitter 40 is of sufficient strength to be useable only during a portion of each revolution or rotation of its wheel assembly 32. Stated in another manner, because each receiving antenna 43 is attached at a fixed position on the vehicle adjacent its wheel assembly 32, the antenna 43 receives a useable output signal from the transmitter only during a portion of each complete rotation of the transmitter therepast. However, since it is known that the magnetic near field varies inversely as the third power of distance, then the received signal during part of the rotation will be substantially stronger than the received signal would be if a more constant transmission distance was selected. The system 36 utilizes a receiver 45 which is operatively connected to each receiving antenna 43 by an associated coaxial cable 46 and the receiver employs unique means for increasing the effective time duration of the useable portions of the output signals from the transmitter 40 to activate or otherwise energize an associated indicator 47 comprising system 36 and such indicator is operatively connected to the receiver 45 in a manner to be described.

The indicator 47 may be of any suitable type. For example, such indicator may be in the form of a light which is observed visually or such indicator may be in the form of an audible indicator such as a bell or buzzer.

The system 36 in addition to the batteries 41 comprising assemblies 42, also has a power source for its receiver 45 and such power source is designated generally by the reference numeral 50 and is suitably operatively connected to the receiver 45 as illustrated at 51. The power source 50 may comprise any suitable source of power and in this example is the usual battery provided for the vehicle 30.

Each transmitter 40 is energized by a low pressure indication as determined by its sensor 37 and will provide continuous pulsed output signals. In general, only during certain time intervals associated ones of these signals are of sufficient strength that they are readily received by an associated receiving antenna 43 and as will now be explained particularly in connection with FIGS. 1 and 2B.

Under conditions wherein the vehicle 30 is standing still, the signal from a transmitter 40 is processed through the receiver 45 and may activate the indicator 47, such as an indicator lamp 47, so that the lamp 47 is ON or OFF depending upon the relative location of the transmitter 40 and receiving antenna 43. In those instances when the vehicle 30 is moving at a relatively low speed, the indicator lamp 47 will be turned ON and OFF sequentially; however, it has been found that the lamp 47, in this case, is turned ON for a sufficiently long time interval to assure full brightness and, conversely, when such lamp is turned OFF it is extinguished completely. With the vehicle moving at such slow speeds, the pulse of light will therefore be fully visible and the low pulse repetition rate will result in a flickering action by the lamp 47. If the vehicle 30 is moving at higher speeds the lamp 47 may be turned ON for a time period which is insufficient to insure full brightness. This performance of the lamp at higher vehicle speeds in combination with the higher pulse repetition rate due to faster rotation reduces the flickering; however, the total perceptible light may be inadequate to be used as an indicator.

To highlight this situation reference is made to FIG. 2B of the drawings wherein it is seen that for each full rotation of a wheel the transmission level is high enough to activate or light the indicator lamp 47, for X degrees while such lamp is dark for the remaining (360 − X) degrees. By way of an example, X may be 30°, in which case the indicator lamp will be dark for a period roughly 11 times as long as the lighted period. Thus, it can be readily seen that an operating transmitter 40 used in a pneumatic tire of a given size will generate a signal having a particular pulse frequency determined by the emission characteristics of the transmitter and the speed of the vehicle. It is also apparent that the performance of the indicator 47 may be substantially improved if the indicator ON time or the time that it is activated is increased relative to its OFF time. In particular, the performance of the indicator 47 may be substantially improved if the effective time duration of a useable signal received by each receiving antenna 43 is increased and this may be achieved by a technique referred to popularly as pulse stretching and means for achieving such pulse stretching is provided in the receiver 45.

The receiver 45 minimizes false alarms by rejecting potentially false alarm inputs including; power supply disturbances generated by the electrical equipment of the vehicle 30, including the starter, horn, window washer, windshield wipers, key alarms, etc.; RF signals generated by natural atmospheric electrical disturbances such as static; RF signals generated by the above-mentioned electrical equipment of the vehicle 30; RF signals generated by electrical equipment external to the vehicle; voicemodulated as well as continuous-wave signals within the selected RF transmission band; and modulated as well as continuous-wave RF signals outside the selected band. Conversely, the RF receiver 45 very reliably recognizes and activates the indicator 47 when receiving a pneumatic tire low pressure warning signal in the form of an RF signal having all of the following characteristics of being in the selected RF band, being an RF signal which is pulsating at the predetermined frequency defined by the self-pulsed oscillator, and being an RF signal which is pulsating at a rate and with a pulse width determined by the angle X of rotation over which a recognizable signal is received in combination with the rotational velocity of an associated wheel assembly 32 of the vehicle 30.

The receiver 45 has an RF pass band which is reduced to a minimum compatible with assured inclusion of the selected RF band under all environmental conditions and has means minimizing or eliminating the above-mentioned false alarm inputs while assuring recognition of a signal indicating a low tire pressure and as will be apparent from the following description. In particular, the receiver 45 has a summer 53 which receives RF signals from an RF transmission line 46 in the event of a low pressure condition in a vehicle tire associated therewith and such signals are then fed to an RF amplifier 54. The amplifier 54 employs a plurality of two transformer coupled stages having tuned primaries and untuned secondaries to amplify the RF signal whereby RF amplification is held at a minimum in view of its relatively high cost and regeneration problems usually associated therewith. The signals from the RF amplifier 54 are fed to a diode amplitude detector 55 which is forward biased to facilitate its ability to perform at very low signal levels and the detector 55 is followed by a low frequency (LF) amplifier, limiter, and filter circuit 56 which serves to attenuate undesired signals. The circuit 56 is a combination LF limiter/band pass amplifier which prevents LF signals on frequencies outside the predetermined frequency band of the oscillator from reaching a level which may activate the indicator. The circuit 56 is followed by a rectifier-integrator circuit 57 which integrates the LF pulses in the pulse train. This circuitry will insure that a pulse train rather than noise spikes is required to activate the indicator while the shortest authentic pulse train will suffice to let the rectified voltage reach a level which will activate succeeding or downstream circuits in the receiver. The circuit 57 thus serves to eliminate the effect of noise spikes and provides more reliable operation the longer the required integration time can be made. The circuit 57 is followed by a pulse stretcher and indicator control circuit 58 and this circuit is particularly useful in overcoming the effect of short trains of pulses. The circuit 58 serves as means for increasing the effective time duration of useable ones of the output signals provided to RF receiver 45 by receiving antennas 43 and insures that a satisfactory indicator signal is provided to the indicator 47. The pulse stretcher 58 is inherently a regenerative device whereby it also increases the sensitivity of the RF receiver since any signal which is capable of activating the pulse stretcher will provide a saturated output signal. The circuit 58 activates indicator 47 to warn the operator of the vehicle 30 in the event of a low pressure condition in any one of the vehicle tires. The receiver 45 also has suitable means in its power supply 50 for filtering such power supply to reduce power supply line disturbances to a tolerable level.

Having described the general operation of the system 36 in connection with the exemplary vehicle 30 a detailed description will now be presented of an improved apparatus which may be used substantially interchangeably with the circuits 58 and 47 previously described in the operation of the overall system and such apparatus is defined by a pulse stretcher and indicator control circuit 58M and indicator 47M.

Pulse Stretcher and Indicator Control 58M and Associated Indicator 47M

The pulse stretcher and indicator control circuit or control 58M which may be used in lieu of the previously described circuits 58 is illustrated in FIG. 3 of the drawing and is used together with the associated indicator 47M shown in FIG. 4.

Because each transmitter 40 is located off center by a distance D from the axis of its wheel assembly 32 each receiving antenna 43 only receives an effective signal through an angular increment of X degrees as explained earlier in connection with FIG. 2B. Accordingly, the receiver 45 activates the indicator for only small time periods whereby it is apparent that the indicator ON time must be increased by pulse stretching, or the like.

The indicator ON time may be easily increased, indeed the indicator may be kept fully ON once activated or energized by employing a well known electrical device such as a silicon controlled rectifier or SCR to control such lamp or indicator. However, the arrangement utilizing an SCR and an ordinary indicator lamp which is lighted merely by providing current flow through its filament is objectionable because an extraneous or short-time false signal may be introduced into the system which would cause such ordinary indicator lamp to become permanent lighted and thereby indicate that one of the tires of system 36 is low in pneumatic pressure. Therefore, the electrical apparatus defined by circuit 58M and indicator 47M may be employed to overcome these problems.

The circuit 58M may be operatively connected to the rectifier-integrator circuit by a lead 172M and comprises an SCR 250 provided with an RC filter defined by resistors 251 and 253 and a capacitor 252. The resistor 253 also serves as a current limiting resistor. The circuit 58M is connected by a lead 179M to one side of the indicator 47M which is in the form of a flasher filament indicator lamp 47M which will be described subsequently. The other side of the lamp 47M is connected to B+ or to the roughly 15 volt supply by a lead 188M.

The lamp 47M is of known construction and operates so that it is extinguished at regular intervals, i.e., current flow through its filament is regularly interrupted whereby by using lamp 47M it is necessary that the control signal to the SCR 250 be repeated in order for such lamp to remain ON and such a repeated signal would be truly representative of a low pressure condition caused by the action of an associated receiving antenna 43 receiving signals during each angular portion X of rotation of the associated wheel assembly.

A typical lamp 47M of this type is manufactured by the Miniature Lamp Department of the General Electric Company, Nela Park, Cleveland, Ohio and described in General Electric Incandescent Bulletin 3-4429. The flasher filament lamp 47M flashes automatically because of integral means therein in the form of a built-in bimetal strip 254M similar to those used in thermostats. When current flows through the lamp filament such filament is heated, giving off light, and the heated filament causes a bimetal strip comprising such filament to bend away from the lead-in wire thereby breaking the circuit and stopping current flow through the filament. As the bimetal strip cools it bends back to its original position and against the lead-in wire to thereby relight the lamp. This cooling and heating cycle provides the flashing action.

In one application of this invention a flasher filament lamp 47M designed to operate on 14 volts and draw a current of 270 milliamperes resulted in the lamp flashing a hundred times per minute. Each ON period thus produced by the cooperating pulse stretching means defined by SCR 250 and lamp 47M is substantially longer than most pulses generated by the system 36 of this invention as a result of a low pressure in a tire. Thus, the disadvantage of having a system which is energized by SCR 250 is eliminated and with flasher filament type lamp 47M a spurious false alarm cannot trigger or activate such lamp except for perhaps one heating cycle of the lamp whereupon current flow therethrough is broken and it is necessary for another signal to be provided to the SCR 250. As a practical matter another signal would only be likely to occur by a low pressure warning signal produced by a sensor 37 actuating an associated transmitter 40.

While present exemplary embodiments of this invention, and methods of practicing the same, have been illustrated and described, it will be recognized that this invention may be otherwise variously embodied and practiced within the scope of the following claims.

What is claimed is:

1. An electrical apparatus for providing a reliable indication when a repetitive series of effective output pulse signals of short time duration are supplied thereto as the result of a low pressure condition in a pneumatic tire of as associated vehicle, said effective pulses being separated by ineffective intervals of much greater time duration than the effective pulses, said electrical apparatus comprising a first electrical device which extends the time periods of said effective output pulses from said electrical apparatus indefinitely when activated by one of said short duration effective pulses; indicating means displaying an inadequate indication when the pulse signal of short time duration is used to control said indicating means directly; and a second electrical device associated with said indicating means for terminating the extended effective output pulses generated by said first electrical device after a preselected time interval and thereby generating effective control pulses of much longer time duration than the short time duration effective output pulses.

2. In a pneumatic tire low pressure monitoring and warning system having; means sensing a low pressure condition in a pneumatic tire supported on an associated vehicle by a rotatable support; a transmitter carried off center by said rotatable support and being rotatable therewith at a distance from the central axis of rotation, said transmitter being actuated by said sensing means and generating output signals at a radio frequency in response to said low pressure condition; a receiving antenna attached at a fixed position adjacent said tire within the near field of said transmitter, the coupling between said transmitter and said receiving antenna being subject to variations resulting from differences in distance, orientation and shielding between said transmitter and said receiving antenna; said receiving antenna receiving usable radio frequency signals only during a relatively small portion of each complete rotation of said transmitter therepast when the coupling is maximized; a receiver; and means operatively connecting said receiving antenna to said receiver; said transmitted radio frequency signal generating in said receiver a discontinuous control signal comprising a repetitive series of effective pulse signals of short duration, said effective pulses being separated by ineffective intervals of much greater time duration than said effective pulses; the improvement comprising a first electrical device which extends the time periods of the effective output pulses indefinitely when activated by one of said short duration effective pulses; indicating means providing an inadequate indication when said pulse signal of short time duration is used to control said indicating means directly; and a second electrical device associated with said indicating means for terminating said extended effective output pulses generated by said first electrical device after a preselected time interval and thereby generating effective control pulses of much longer time duration than the short time duration effective pulses wherein the long duration control pulses control said indicating means to thereby define the identifiable indication by a repeated activation of said first electrical device.

3. An apparatus as set forth in claim 1 in which said first electrical device is an SCR.

4. An apparatus as set forth in claim 3 in which said indicating means is a filament lamp.

5. An apparatus as set forth in claim 4 in which said second electrical device is a bimetallic strip, and in which said indicating means is a flasher filament lamp wherein said second electrical device is combined with said indicating means.

6. In a pneumatic tire low pressure monitoring and warning system as set forth in claim 2 the further improvement wherein said first electrical device is an SCR.

7. In a pneumatic tire low pressure monitoring and warning system as set forth in claim 6 the further improvement wherein said indicating means is a filament lamp.

8. In a pneumatic tire low pressure monitoring and warning system as set forth in claim 7 the further improvement wherein said second electrical device is a bimetal strip and in which said indicating means is a flasher filament lamp wherein said second electrical device is combined with said indicating means.

9. In a pneumatic tire low pressure monitoring and warning system as set forth in claim 8 the further improvement comprising an RC filter and a current limiting resistor connected to said SCR.

10. In a pneumatic tire low pressure monitoring and warning system as set forth in claim 6 in which each of said transmitters comprises a self-pulsed oscillator.

* * * * *